(12) United States Patent
Holbach et al.

(10) Patent No.: US 8,505,762 B2
(45) Date of Patent: Aug. 13, 2013

(54) VESSEL NECK CONSTRUCTION OF A PRESSURE VESSEL

(75) Inventors: Markus Holbach, Bornheim (DE); Stefan Walbroel, Sankt Augustin (DE)

(73) Assignee: Kautex Maschinenbau GmbH, Bonn (DE)

( * ) Notice: Subject to any disclaimer, the term of this patent is extended or adjusted under 35 U.S.C. 154(b) by 0 days.

(21) Appl. No.: 13/502,883

(22) PCT Filed: Sep. 8, 2010

(86) PCT No.: PCT/EP2010/005516
§ 371 (c)(1),
(2), (4) Date: Apr. 19, 2012

(87) PCT Pub. No.: WO2011/047752
PCT Pub. Date: Apr. 28, 2011

(65) Prior Publication Data
US 2012/0205337 A1    Aug. 16, 2012

(30) Foreign Application Priority Data

Oct. 19, 2009  (DE) .......................... 10 2009 049 948

(51) Int. Cl.
*F17C 1/00*    (2006.01)
(52) U.S. Cl.
USPC ........................................................ 220/586
(58) Field of Classification Search
USPC .............. 220/592, 586, 582, 62.22, 581, 612, 220/613
See application file for complete search history.

(56) References Cited

U.S. PATENT DOCUMENTS

| | | | |
|---|---|---|---|
| 2,784,865 A | | 3/1957 | Rieke |
| 3,917,115 A | * | 11/1975 | Travers et al. ..................... 222/3 |
| 4,350,261 A | * | 9/1982 | Roth ............................. 220/270 |
| 4,700,868 A | | 10/1987 | Dirkin |
| 5,429,845 A | | 7/1995 | Newhouse |

(Continued)

FOREIGN PATENT DOCUMENTS

| | | |
|---|---|---|
| DE | 2152123 | 5/1973 |
| DE | 19631546 | 11/1997 |

(Continued)

OTHER PUBLICATIONS

PCT International Search Report dated Nov. 22, 2010, received in corresponding PCT Application No. PCT/EP2010/005516, 3 pgs.

(Continued)

*Primary Examiner* — Steven A. Reynolds
*Assistant Examiner* — King M Chu
(74) *Attorney, Agent, or Firm* — Grossman Tucker Perreault & Pfleger, PLLC

(57) ABSTRACT

The invention relates to a pressure vessel for the storage of liquid or gaseous media. The pressure vessel (1) comprises a plastic inner vessel (2) with at least one neck piece (4) which is not connected in one piece with the latter and which is arranged on the vessel neck in the region of the vessel orifice (8), and with a supporting jacket (3) at least partially surrounding the plastic inner vessel (2) and the neck piece (4). The neck piece (4) is provided with means for receiving a connection fitting (9). The pressure vessel according to the invention is distinguished by an insert (5) which forms at least part of the vessel neck and which forms a sealing seat for the fitting (9) to be inserted into the neck piece (4).

12 Claims, 4 Drawing Sheets

(56) References Cited

U.S. PATENT DOCUMENTS

Figure 3:
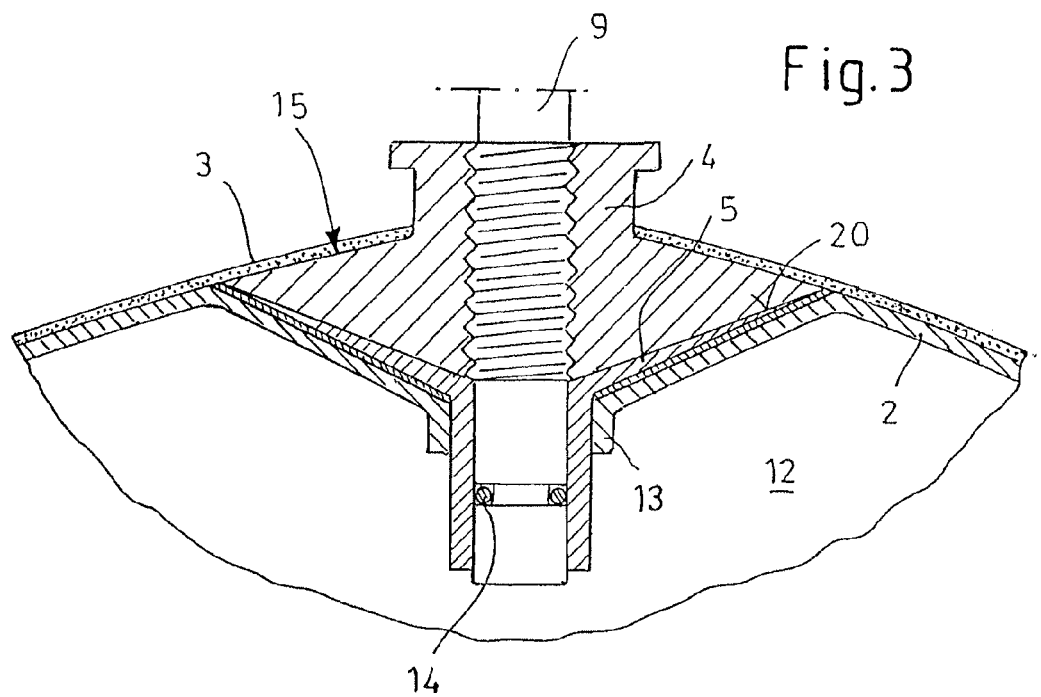

| | | | |
|---|---|---|---|
| 5,476,189 A * | 12/1995 | Duvall et al. | 220/590 |
| 5,817,203 A | 10/1998 | Moser | |
| 6,186,356 B1 * | 2/2001 | Berkley et al. | 220/582 |
| 6,230,922 B1 * | 5/2001 | Rasche et al. | 220/586 |
| 7,032,767 B2 * | 4/2006 | Funck | 220/581 |
| 8,231,028 B2 * | 7/2012 | Matsuoka et al. | 220/582 |
| 2003/0089723 A1 | 5/2003 | Funck | |
| 2003/0160201 A1 | 8/2003 | Sugiura | |
| 2005/0006393 A1 | 1/2005 | Carter | |
| 2005/0173433 A1 * | 8/2005 | Spahr | 220/62.22 |
| 2008/0149636 A1 * | 6/2008 | Carter et al. | 220/62.22 |
| 2009/0255940 A1 * | 10/2009 | Murate et al. | 220/592 |
| 2010/0163565 A1 | 7/2010 | Matsuoka | |

FOREIGN PATENT DOCUMENTS

| | | |
|---|---|---|
| DE | 102006057422 | 6/2008 |
| EP | 0203631 | 12/1986 |
| EP | 0753700 | 1/1997 |
| EP | 0821194 | 1/1998 |

OTHER PUBLICATIONS

PCT Translation of the International Preliminary Report on Patentability dated Jun. 14, 2012, received in corresponding PCT Application No. PCT/EP2010/005516, 7 pgs.

* cited by examiner

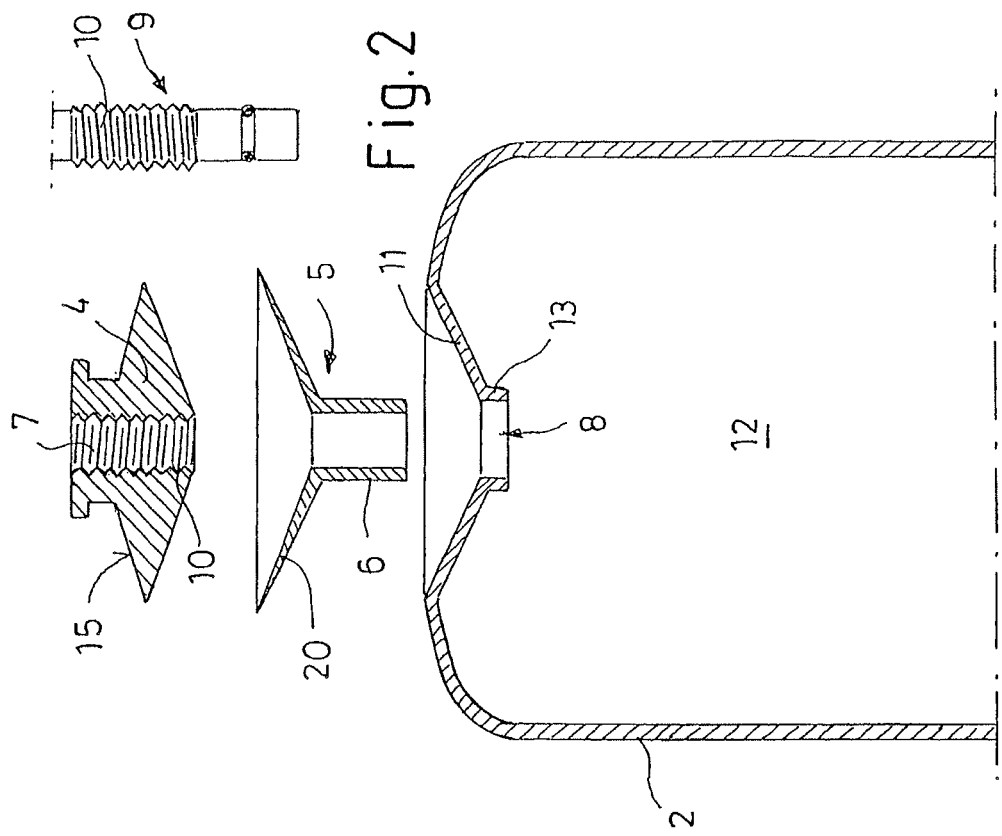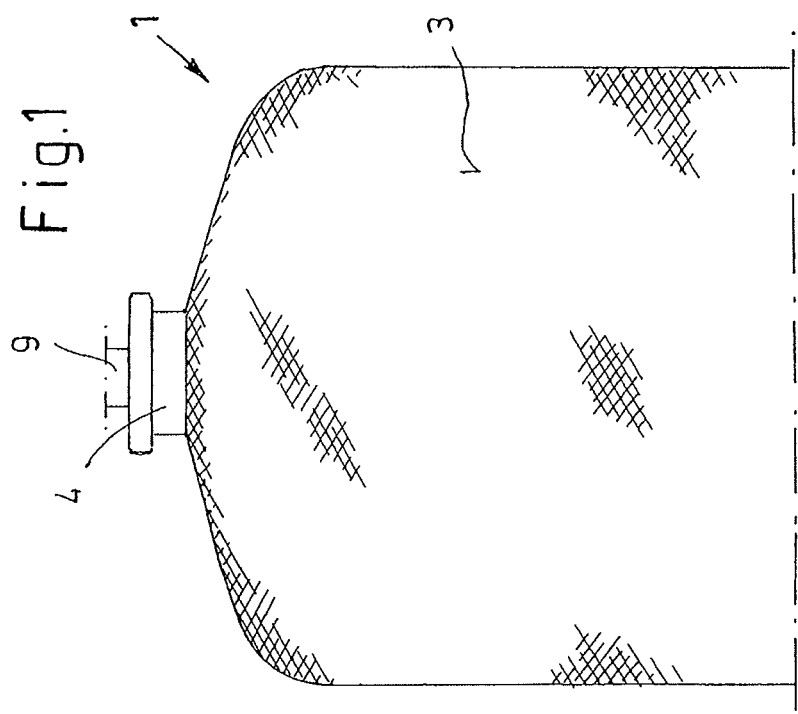

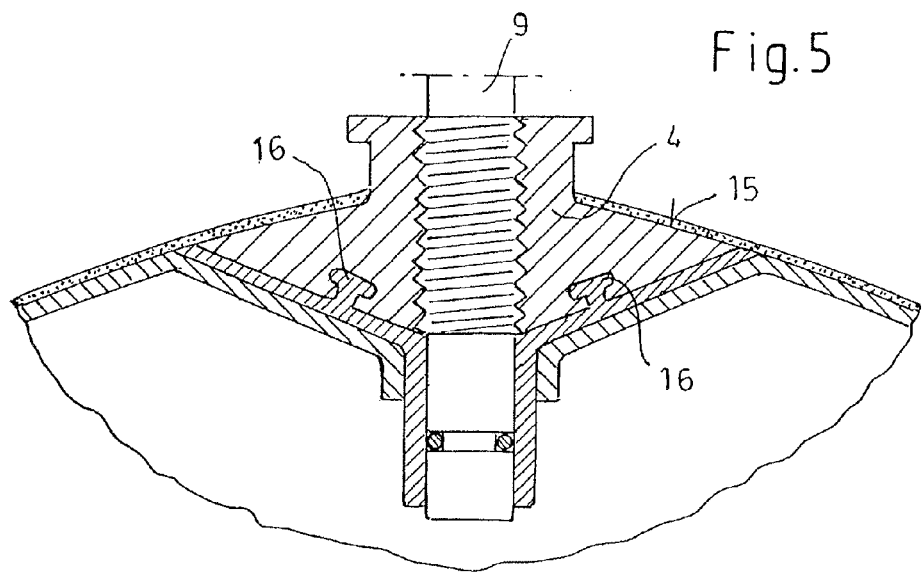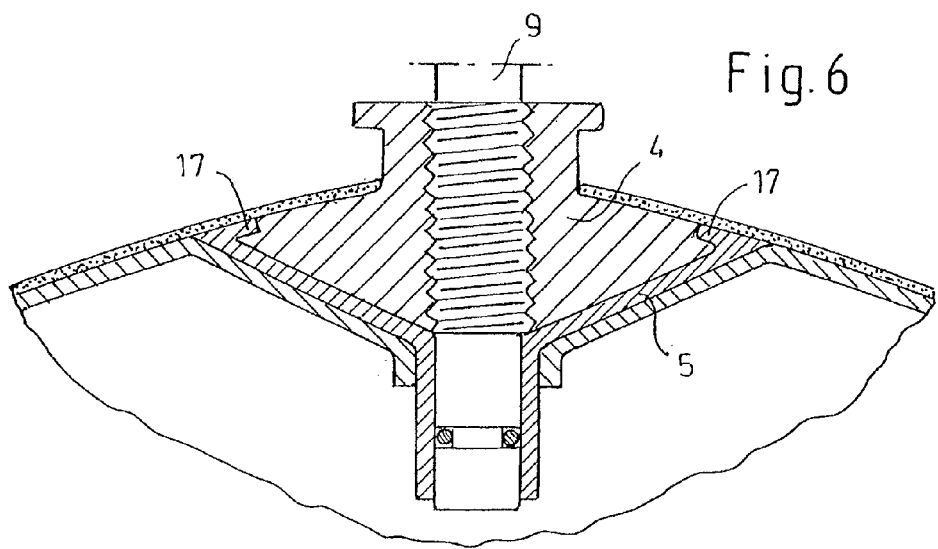

VESSEL NECK CONSTRUCTION OF A PRESSURE VESSEL

The invention relates to a pressure vessel for the storage of liquid or gaseous media, comprising a plastic inner vessel with at least one neck piece which is not connected in one piece with the latter and is arranged on the vessel neck in the region of a vessel orifice, and with a supporting jacket at least partially surrounding the plastic inner vessel and the neck piece, the neck piece being provided with means for receiving a connection fitting.

Such a pressure vessel is known, for example, from DE 2 152 123. The compressed gas vessel described there consists of a dimensionally stable, rotationally symmetrical gas-tight inner vessel, cylindrical in its middle region, with two pole pieces or neck pieces placed coaxially from outside onto the bottoms of the inner vessel, and with an outer casing which is wound onto the inner vessel, so as to cover the pole pieces, and is laminated from continuous threads and cured plastic and which forms a supporting jacket for the inner vessel. The pole pieces or neck pieces serve for the leak-tight connection of a fitting, for example of a valve.

Compressed gas vessels of this type may be designed, for example, for gas pressures of between 30 bar and 700 bar, but it is known that plastic inner vessels do not in themselves possess the required pressure stability, since many plastics begin to flow under high pressure. It is therefore known to provide compressed gas vessels of the type mentioned in the introduction with a supporting jacket. The supporting jacket usually consists of threads impregnated with synthetic resin which are wound around the inner vessel made from plastic. The plastic inner vessel is also commonly designated as a liner. The pole pieces are designated in the literature both as neck pieces and as what are known as boss parts or else as connection pieces. These usually consist of metal and are provided with an internal thread for receiving a fitting in the form of a valve or the like. In pressure vessels, this is required, as a rule, both for stability reasons and reasons of leak-tightness.

A pressure vessel of the type mentioned in the introduction is also known, for example, from EP 0 753 700 B1. This pressure vessel comprises two orifices which lie in the neck region and in each of which is arranged a neck piece which closes and seals off the orifice, the neck pieces being provided, in the end region facing the pressure vessel, with a frustoconical collar which is surrounded on the inside by the liner and on the outside by the supporting jacket.

In almost all known pressure vessels of the type mentioned in the introduction, the sealing off of the inner vessel or plastic inner vessel with respect to the neck piece or in the region of the neck piece plays a critical part, so that the vessels fulfil the licensing requirements with regard to leakage, for example under a test pressure of 450 bar.

In the pressure vessel according to DE 2 152 123, there is provision whereby the wall of the inner vessel merges continuously into an integrally formed approximately hollow-cylindrical vessel neck directed axially outward, and the placed-on pole piece/neck piece is designed to come to bear with its inner contour against the outer contour of the inner vessel in the transitional region between the vessel bottom, orifice and vessel neck, such that a flange-shaped part bearing against the bottom merges into a shaped-out approximately hollow-cylindrical pole piece neck, of which the inner wall surrounding the vessel neck widens conically outward, against which the vessel wall is pressed sealingly and non-positively, by being deformed radially outward, by a correspondingly conically shaped connection piece screwed coaxially to the pole piece neck. As a result of this arrangement, it may be assumed that the vessel neck is tension-mounted between the pole piece neck and connection piece, with a sealing means interposed, such that the connection is sufficiently sealed off. This arrangement requires a multipart pole piece/neck piece and in terms of its mounting is relatively complicated.

In the pressure vessel according to EP 753 700 B1, there is provision whereby the neck region of the liner, on the one hand, is sealed off by means of a sealing ring with respect to a shoulder of the neck piece and, on the other hand, is sealed off by means of a sealing washer between the end face of the neck portion of the liner and the stop face, cooperating therewith, of the neck piece.

This type of sealing off is critical particularly in the region where the end face of the plastic inner vessel neck bears against the neck piece, with the sealing ring interposed.

Such sealing off may present problems particularly when the inner vessel or plastic inner vessel is produced by extrusion blow-molding.

Similar pressure vessels are for instance known from EP 200 734 A2, U.S. Pat. No. 6,230,922 B1, DE 10 2006 057 422 B3 as well as DE 196 31 546 C1.

The object on which the invention is based, therefore, is to provide a pressure vessel of the type mentioned in the introduction, in which effective sealing off is achieved by means of relatively simple structural measures.

The object is achieved by means of a pressure vessel for the storage of liquid or gaseous media, comprising a plastic inner vessel with at least one neck piece which is not connected in one piece to the latter and which is arranged on the vessel neck in the region of a vessel orifice, and with a supporting jacket at least partially surrounding the plastic inner vessel and the neck piece, the neck piece being provided with means for receiving a connection fitting, the pressure vessel according to the invention being characterized by at least one insert which forms at least part of the vessel neck and which forms a sealing seat for the fitting to be inserted into the neck piece.

It is thereby possible to seal off a fitting directly with respect to the insert, so that there is no need for complicated measures for sealing off the plastic inner vessel with respect to the neck piece or for sealing off the neck piece with respect to the plastic inner vessel.

The insert comprises a sleeve-shaped cylindrical part which forms with the wall of the plastic inner vessel a vessel neck drawn into the interior of the latter.

The insert may comprise, for example, a sleeve-shaped cylindrical part which penetrates into the vessel orifice and which preferably passes through this.

In an especially preferred variant of the pressure vessel according to the invention, there is provision whereby the sleeve-shaped cylindrical part of the insert penetrates into the filling volume of the plastic inner vessel to an extent such that the vessel internal pressure acts upon the insert from outside such as to reinforce the sealing off of a fitting within the insert by virtue of the vessel internal pressure.

Alternatively, there may be provision whereby the insert comprises a sleeve-shaped cylindrical part which is arranged coaxially to the vessel orifice and in alignment with this.

In a variant of the pressure vessel according to the invention, there is provision whereby the insert has a collar which is welded and/or adhesively bonded to the wall of the plastic inner vessel. In the preferred variant of the pressure vessel, the insert is placed onto the outside of the plastic inner vessel. Alternatively, the insert may have been attached to the plastic inner vessel from inside. However, both variants may also be provided. The insert may, for example, have been introduced during the extrusion blow-molding of the plastic inner vessel. Subsequent insertions are also possible if the dimensioning of the vessel orifice is appropriate.

It is especially advantageous if the wall of the plastic inner vessel is drawn in conically in the region of the vessel orifice, and the collar of the insert is designed complementarily to this.

In order to make it easier to center the neck piece with respect to the plastic inner vessel before the supporting jacket is applied, there may be provision whereby the insert is connected positively to the neck piece. This also contributes to stabilizing the composite assembly composed of the neck piece, plastic inner vessel and supporting jacket under any transverse stress upon the fitting.

Preferably, the insert consists of injection-molded plastic which can be produced with relatively low manufacturing tolerances and therefore ensures especially good sealing off and/or fit. Alternatively, the insert may have been produced by piped extrusion with subsequent expansion. The insert may likewise be produced as an extrusion blow-molded component which has undergone surface machining. Finally, the insert may be produced as any plastic part which has been machined by cutting.

Expediently, the plastic inner vessel was obtained by extrusion blow-molding. As is known, in extrusion blow-molding, wall thickness variations may occur due to production. The combination of an injection-molded insert with an extrusion blow-molded plastic inner vessel is especially beneficial in as much as the injection-molded insert provides fit surfaces and sealing surfaces which fulfil the required dimensional accuracy.

It is especially expedient if the insert consists of a material compatible with the plastic inner vessel in terms of weldability. By the insert or the collar of the insert being welded to the wall of the plastic inner vessel, sufficient leak-tightness is achieved in this region.

The neck piece preferably consists of metal, but it may also consist of a relatively impact-tough and dimensionally stable plastic which is suitable for receiving a connection thread of a connection fitting.

All commercially available weldable thermoplastics, such as HDPE, PP, PUR, POM, TPE, polyester, etc., may be considered for the liner or for the plastic inner vessel.

The plastic inner vessel may have, for example, a multilayer design with barrier layers for reducing the permeability to hydrocarbons and/or oxygen and/or hydrogen.

The connection fitting, for example in the form of a connection valve, may, for example, be sealed off in the insert or in the sleeve-shaped cylindrical part of the insert by means of a cylindrical connection piece via one or more O-ring seals.

Figure 4:
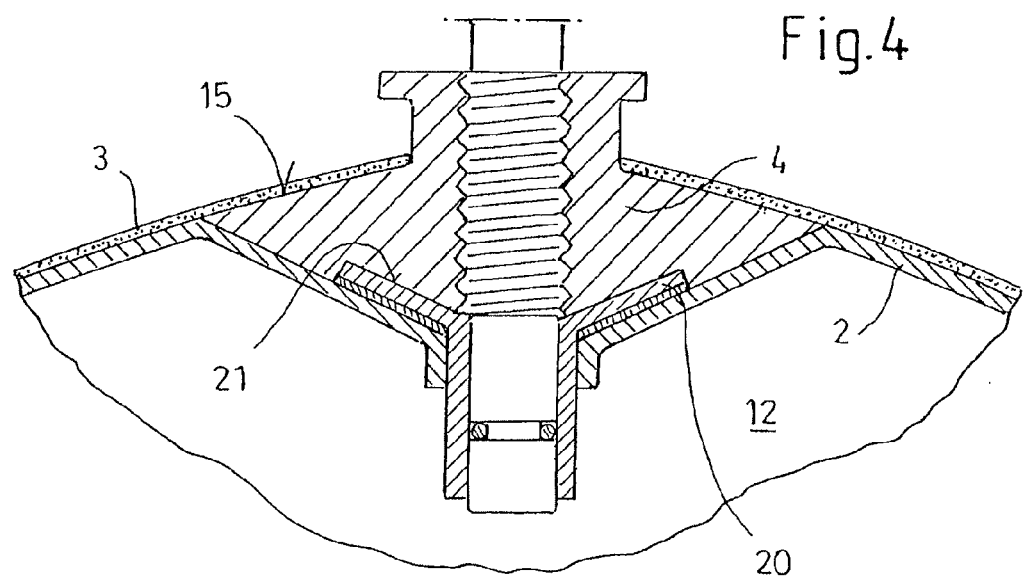
Figure 7:
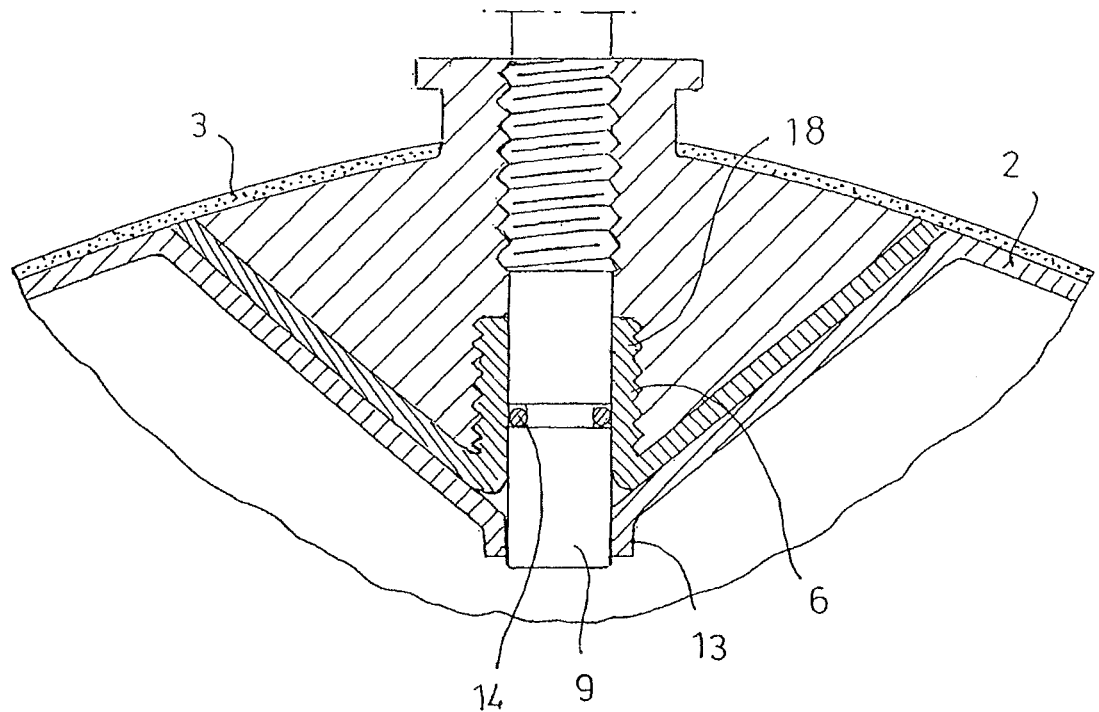
Figure 8:
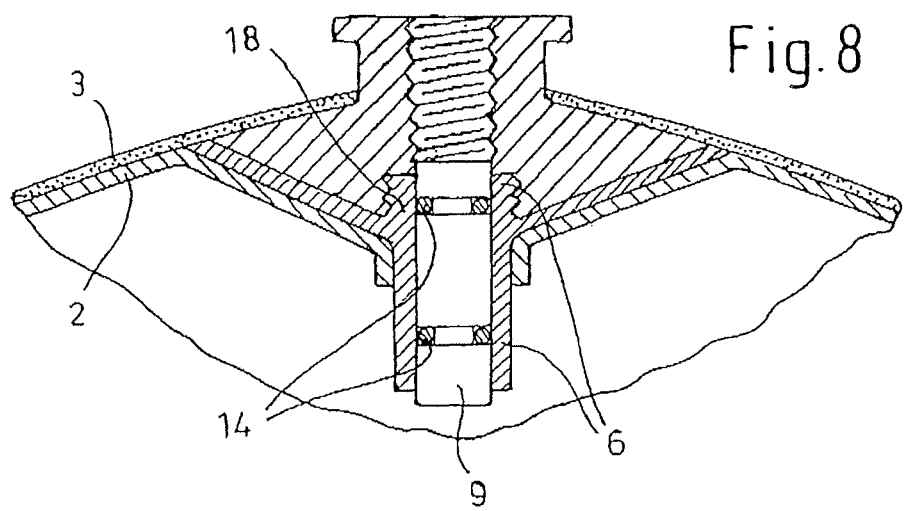

The invention is explained below by means of an exemplary embodiment illustrated in the drawings in which:

FIG. 1 shows a part view of a pressure vessel according to the invention,

FIG. 2 shows a longitudinal section through a pressure vessel according to FIG. 1 without the supporting jacket surrounding it, as an exploded view, FIG. 3 shows an enlarged sectional view of the pressure vessel according to the invention in the connection region of a fitting according to a first exemplary embodiment, FIG. 4 shows a second exemplary embodiment of the pressure vessel according to the invention, the sectional view corresponding to that in FIG. 3, FIG. 5 shows a third exemplary embodiment of the pressure vessel according to the invention, the sectional view corresponding to those in FIGS. 3 and 4, FIG. 6 shows a fourth exemplary embodiment of the pressure vessel according to the invention, and FIG. 7 shows a fifth exemplary embodiment of the pressure vessel according to the invention, FIG. 8 shows a sixth exemplary embodiment of the pressure vessel according to the invention.

The pressure vessel 1 illustrated in FIG. 1 comprises a plastic inner vessel 2 which is obtained preferably by extrusion blow-molding and which is surrounded by a supporting jacket 3 consisting of a fiber reinforcement, the fiber reinforcement being embedded in a matrix composed of synthetic resins.

Although the plastic inner vessel 2 according to the preferred exemplary embodiment has been obtained by extrusion blow-molding, it may also have been obtained by means of a thermoforming method or by means of a rotational sintering method (slush molding). Materials which may be considered for the plastic inner vessel 2 are polyethylene, polypropylene, polyester, polyurethane, POM, TPE or the like.

The supporting jacket may consist of carbon fibers, aramid threads, glass threads or the like. The supporting jacket is preferably produced by winding resin-impregnated fibers/threads around the plastic inner vessel 2. This procedure is known per se. For the sake of simpler illustration, the supporting jacket 3 is depicted in only some of the figures.

As may be gathered particularly from FIG. 2, the pressure vessel 1 according to the invention comprises the abovementioned plastic inner vessel 2, a neck piece 4 which is preferably formed from metal, and an insert arranged between the neck piece 4 and the plastic inner vessel 2. The insert 5 comprises a sleeve-shaped cylindrical part 6 which is arranged coaxially with a threaded bore 7 in the neck piece 4 and with a vessel orifice 8 in the plastic inner vessel 2.

The neck piece 4, insert 5 and vessel orifice 8 define a vessel neck which serves for receiving a connection fitting 9. For the sake of simplicity, only part of the connection fitting 9 is illustrated, to be precise that part which is received by the threaded bore 7 of the neck piece 4 and by the cylindrical part 6 of the insert 5. For this purpose, fastening threads 10 complementary to one another are provided in each case in the neck piece 4, on the one hand, and on the connection fitting 9, on the other hand.

Contrary to what are known as composite vessels or pressure vessels according to the prior art, the wall 11 of the plastic inner vessel 2 is drawn in conically in the region of the vessel orifice 8 and forms a connection piece 13 reverse-drawn into the vessel interior 12.

The insert 5, which preferably likewise consists of a thermoplastic, is likewise designed conically and is provided with a collar 20 formed correspondingly to the contour of the wall 11 of the plastic inner vessel 2 in the region of the vessel orifice 8.

In the exemplary embodiments of the pressure vessel according to the invention which are illustrated in FIGS. 2 to 6, there is provision whereby, in the assembled state, the cylindrical part 6 of the insert 5 passes through the vessel orifice 8 and projects into the vessel interior 12.

The insert 5 and wall 11 of the plastic inner vessel 2 are preferably welded to one another in the region of the collar 20, so that the parting plane between the insert 5 and the wall 11 of the plastic inner vessel 2 is correspondingly gas-tight. For this purpose, there is provision whereby the insert 5 consists of a material compatible with the plastic inner vessel 2 in terms of weldability. If the insert 5 consists of a plastic which cannot be welded to the wall 11 of the plastic inner vessel 2, the said insert may, for example, be bonded adhesively to the wall 11.

The neck piece 4, insert 5 and vessel orifice 8 are centered with one another such that a connection fitting 9 or a tubular piece of a connection fitting 9 can be inserted sealingly into the orifice thereby formed. In this case, the sleeve-shaped cylindrical part 6 of the insert 5 forms, inside the orifice delimited by the latter, a sealing seat for a sealing means 14 of the connection fitting 9. In the present case, an O-ring seal is provided, which is arranged in a known way in a groove of the tubular extension of the connection fitting 9. To improve the sealing action, there may be provision whereby the tubular extension of the connection fitting 9 has a plurality of grooves arranged at a distance from one another and having in each case O-ring seals arranged therein.

In the exemplary embodiment of the pressure vessel 1 according to FIGS. 2 to 6, there is provision whereby the cylindrical part 6 of the insert 5 projects into the vessel interior 12 such and is dimensioned such that sealing off takes place by means of the connection fitting 9 in that region of the cylindrical part 6 which penetrates into the vessel interior 12. Self-reinforcing sealing off when the pressure vessel 1 is acted upon by internal pressure is thereby achieved in an advantageous way. The pressure prevailing in the pressure vessel 1 acts radially on the cylindrical part 6 of the insert 5 and therefore contributes especially beneficially to sealing off the pressure vessel 1.

To mount the pressure vessel 1, the insert 5 is glued and/or welded into the conical drawn-in region of the wall 11 of the plastic inner vessel. The neck piece 4 is then put in place and centered. In the sectional views illustrated in FIGS. 3 and 4, in each case an adhesive layer/adhesion promoter layer, which is not designated in any more detail, is illustrated, merely as an indication, between the insert 5 and the conically drawn-in region of the wall 11 of the plastic inner vessel.

The neck piece 4 is fixed by the supporting jacket 3 being wound with fibers, which takes place at an acute angle with respect to the longitudinal axis of the pressure vessel 1, such that the shoulder region 15 of the neck piece 4 is bordered by the supporting jacket 3.

In order to center the neck piece 4 at least partially during mounting, it may temporarily be fixed into the insert 5 and in the neck piece 4 by means of a kind of gage.

In the variant of the pressure vessel, as shown in FIG. 4, the collar 20 of the insert 5 is inserted into a recess 21 of the neck piece 4 for the purpose of centering with respect to the latter.

According to an alternative embodiment of the pressure vessel 1 according to FIG. 5, there is provision whereby the neck piece 4 is connected positively to the insert 5 via dovetail connectors 16. For this purpose, grooves in the form of a segment of a circle, with a dovetail profile, into which corresponding profile portions of the insert 5 engage, may be provided in that surface of the neck piece 4 which faces away from the shoulder region 15.

The insert 5 may either have been integrally formed onto the neck piece 4 or the dovetail connectors 16 are arranged in the manner of a bayonet fastening, so that the neck piece 4 can be brought into engagement with the insert 5 as a result of rotational movement.

Another variant of the pressure vessel 1 is illustrated in FIG. 6. According to this variant, the insert 5 is provided, at its margin facing away from the cylindrical part, with a peripheral collar 17 which surrounds the shoulder region 15 of the neck piece 4.

A further variant of the pressure vessel according to the invention is illustrated in FIG. 7. The cylindrical part 6 of the insert 5 is drawn in or reverse-drawn with respect to that surface of the insert 5 facing the neck piece 4 and is provided with a thread 18 which cooperates with an internal thread 19 of the neck piece 4. In this arrangement, the cylindrical part 6 of the insert 5 does not pass through the vessel orifice 8, but, instead, it is oriented coaxially and in alignment with the vessel orifice 8.

In the variant of the pressure vessel 1 according to the invention, as illustrated in FIG. 8, the cylindrical part 6 of the insert is of continuous form such that it both passes completely through the neck piece 4 and the vessel orifice 8 and projects into the filling volume of the pressure vessel 1. In that region of the insert 5 which passes through the neck piece 4, the latter is provided on its outer circumference with a thread 18. The connection fitting 9 is sealed off, within the insert 5, with respect to the inner wall of the insert 5 via two sealing means 14 spaced apart from one another in the axial direction. There may, for example, be two O-ring seals arranged at a distance from one another.

LIST OF REFERENCE SYMBOLS

1 Pressure vessel
2 Plastic inner vessel
3 Supporting jacket
4 Neck piece
5 Insert
6 Cylindrical part
7 Threaded bore
8 Vessel orifice
9 Connection fitting
10 Fastening thread
11 Wall
12 Vessel interior
13 Connection piece
14 Sealing means
15 Shoulder region of the neck piece
16 Dovetail connector
17 Collar
18 Thread
19 Internal thread
20 Collar What claimed is:

1. Pressure vessel for the storage of liquid or gaseous media, comprising:
a plastic inner vessel with at least one neck piece which is not provided as a single piece with the plastic inner vessel and which is arranged on a vessel neck in a region of a vessel orifice, and with a supporting jacket at least partially surrounding the plastic inner vessel and the neck piece, the neck piece provided with means to receive a connection fitting, and at least one insert which forms at least part of the vessel neck and which forms a sealing seat for the connection fitting to be received into the neck piece, wherein the insert comprises a sleeve-shaped cylindrical part, characterized in that the sleeve-shaped cylindrical part of the insert forms, with a wall of the plastic inner vessel, a vessel neck drawn into an interior of the plastic inner vessel, wherein the wall of the plastic inner vessel is drawn in conically in the region of the vessel orifice to provide a conical portion, and forms a connection piece reverse-drawn into the interior of the plastic inner vessel; and
wherein the neck piece is seated in the conical portion of the plastic inner vessel; and
wherein the sleeve-shaped cylindrical part of the insert provides the sealing seat for the connection fitting and projects into the interior of the plastic inner vessel such that, when the pressure vessel is pressurized, an internal pressure of the vessel acts radially upon the sleeve-shaped cylindrical part to reinforce a seal formed between the sleeve-shaped cylindrical part and the connection fitting.

2. Pressure vessel according to claim 1, characterized in that the sleeve-shaped cylindrical part which penetrates into the vessel orifice and which preferably passes through the vessel orifice.

3. Pressure vessel according to claim 2, characterized in that the sleeve-shaped cylindrical part of the insert penetrates into the filling volume of the plastic inner vessel.

4. Pressure vessel according to claim 1, characterized in that the sleeve-shaped cylindrical part which is arranged coaxially to the vessel orifice and in alignment with the vessel orifice.

5. Pressure vessel according to claim 1, characterized in that the insert has a collar which is at least one of welded and adhesively bonded to the wall of the plastic inner vessel.

6. Pressure vessel according to claim 1, characterized in that the wall of the plastic inner vessel is drawn in conically in the region of the vessel orifice, and in that the collar of the insert is designed complementarily to the wall of the plastic inner vessel drawn in conically in the region of the vessel orifice.

7. Pressure vessel according to claim 1, characterized in that the neck piece is connected positively to the insert.

8. Pressure vessel according to claim 1, characterized in that the insert is produced from injection-molded plastic.

9. Pressure vessel according to claim 1, characterized in that the plastic inner vessel is also obtained by extrusion blow-molding.

10. Pressure vessel according to claim 1, characterized in that the insert consists of a material compatible with the plastic inner vessel in terms of weldability.

11. Pressure vessel according to claim 1, characterized in that the neck piece consists of metal.

12. Pressure vessel according to claim 1, characterized in that the plastic inner vessel is of multilayer design, the latter preferably comprising at least one barrier layer consisting of a material with low permeability or with impermeability to at least one of hydrocarbons, oxygen and hydrogen.

* * * * *